(12) United States Patent
Ellis

(10) Patent No.: US 10,522,883 B2
(45) Date of Patent: *Dec. 31, 2019

(54) RECYCLING ELECTROCHEMICAL CELLS AND BATTERIES

(71) Applicant: RSR Technologies, Inc., Dallas, TX (US)

(72) Inventor: Timothy W. Ellis, Dallas, TX (US)

(73) Assignee: RSR TECHNOLOGIES, INC., Dallas, TX (US)

(*) Notice: Subject to any disclaimer, the term of this patent is extended or adjusted under 35 U.S.C. 154(b) by 1088 days.

This patent is subject to a terminal disclaimer.

(21) Appl. No.: 14/879,178

(22) Filed: Oct. 9, 2015

(65) Prior Publication Data

US 2016/0036099 A1 Feb. 4, 2016

Related U.S. Application Data

(63) Continuation-in-part of application No. 14/222,005, filed on Mar. 21, 2014, now Pat. No. 9,831,537, which is a continuation of application No. 12/776,822, filed on May 10, 2010, now Pat. No. 8,714,361.

(51) Int. Cl.
| | | |
|---|---|---|
| B03D 1/02 | (2006.01) |
| H01M 4/56 | (2006.01) |
| H01M 4/54 | (2006.01) |
| H01M 10/54 | (2006.01) |
| H01M 4/20 | (2006.01) |

(52) U.S. Cl.
CPC ............ *H01M 10/54* (2013.01); *H01M 4/20* (2013.01)

(58) Field of Classification Search
USPC ........................................................ 209/166
See application file for complete search history.

(56) References Cited

U.S. PATENT DOCUMENTS

| | | | |
|---|---|---|---|
| 1,826,724 A | 10/1931 | Booss et al. |
| 3,881,954 A | 5/1975 | Maskalick |
| 3,954,450 A | 5/1976 | Kuhn et al. |
| 3,985,650 A | 10/1976 | Saitoh et al. |
| 4,116,219 A | 10/1978 | Elmore et al. |
| 4,253,942 A | 3/1981 | Gaumann |
| 4,410,410 A * | 10/1983 | Deborski ............ C25B 11/02 204/277 |
| 4,415,410 A | 11/1983 | Reich |
| 4,713,304 A | 12/1987 | Rao et al. |
| 4,853,114 A | 8/1989 | Lewis et al. |
| 5,096,611 A * | 3/1992 | Matthew ............ B01D 33/042 252/182.1 |
| 5,707,015 A * | 1/1998 | Guthrie ................ H01M 10/54 241/20 |
| 5,849,063 A | 12/1998 | Myerson et al. |
| 6,068,131 A | 5/2000 | Styron et al. |
| 6,267,923 B1 | 7/2001 | Albert et al. |
| 6,351,878 B1 | 3/2002 | Rao |
| 7,195,865 B2 | 3/2007 | Kawanishi et al. |
| 7,517,370 B2 * | 4/2009 | Petersen ................ H01B 1/08 141/1.1 |
| 8,714,361 B2 * | 5/2014 | Ellis ........................ B03D 1/02 209/164 |
| 9,831,537 B2 * | 11/2017 | Ellis ........................ B03D 1/02 |
| 2014/0291210 A1 | 10/2014 | Ellis |

FOREIGN PATENT DOCUMENTS

| | | | |
|---|---|---|---|
| EP | 0174866 A2 | | 3/1986 |
| EP | 1770819 B1 | | 4/2007 |
| GB | 343048 | * | 2/1931 |
| JP | S63-55121 | | 3/1988 |
| JP | 2003-272720 | | 9/2003 |
| JP | 2004-127636 | | 4/2004 |
| JP | 2007-042295 | | 2/2007 |
| JP | 2009-144219 | | 7/2009 |
| JP | 2009-202065 | | 9/2009 |
| WO | WO 2005/015668 A1 | | 2/2005 |
| WO | WO 2007/026322 A2 | | 3/2007 |
| WO | WO 2008/022415 A1 | | 2/2008 |
| WO | WO 2008/111709 A1 | | 2/2008 |

OTHER PUBLICATIONS

Stevenson, M., "Recycling: Lead-Acid Batteries: Overview," *Encyclopedia of Electrochemical Power Sources*, pp. 165-178, 2009, Elsevier B.V., Editor-in-Chief: Jürgen Garche.

Sloop, S.E., Kotaich, K., Ellis, T.W., & Clarke, R., "Recycling: Lead-Acid Batteries: Electrochemical." *Encyclopedia of Electrochemical Power Sources*, pp. 179-187, 2009, Elsevier B.V., Editor-in-Chief: Jürgen Garche.

Kotaich, K. & Sloop, S.E., "Recycling: Lithium and Nickel-Metal Hydride Batteries," *Encyclopedia of Electrochemical Power Sources*, pp. 188-198, 2009, Elsevier B.V., Editor-in-Chief: Jürgen Garche.

Scott, K., "Recycling: Nickel-Metal Hydride Batteries," *Encyclopedia of Electrochemical Power Sources*, pp. 199-208, 2009, Elsevier B.V., Editor-in-Chief: Jürgen Garche.

Xu, J., Thomas H.R., Francis R.W., Lum, K.R., Wang, J., Liang, B., "A review of processes and technologies for the recycling of lithium-ion secondary batteries," *Journal of Power Sources*, vol. 177, Jan. 2008, pp. 512-527.

S. M. Shin, N. H. Kim, J. S. Sohn, D. H. Yang, Y. H. Kim, "Development of a metal recovery process from Li-ion battery wastes," *Hydrometallurgy*, vol. 79, Issues 3-4, Oct. 2005, pp. 172-181.

Junmin Nan, Dongmei Han. Xiaoxi Zuo. "Recovery of metal values from spent lithium-ion batteries with chemical deposition and solvent extraction," *Journal of Power Sources*, vol. 152, Dec. 1, 2005, pp. 279-284.

Rong-Chi Wanga, Yu-Chuan Lina, She-Huang Wub, "A novel recovery process of metal values from the cathode active materials of the lithium-ion secondary batteries," Hydrometallurgy, vol. 99, Issues 3-4, Nov. 2009, pp. 194-201.

(Continued)

*Primary Examiner* — Thomas M Lithgow
(74) *Attorney, Agent, or Firm* — K&L Gates LLP

(57) ABSTRACT

Methods for separating and recycling battery and electrochemical cell materials are disclosed.

12 Claims, No Drawings

(56) References Cited

OTHER PUBLICATIONS

Y. Pranolo, W. Zhang, C.Y. Cheng, "Recovery of metals from spent lithium-ion battery leach solutions with a mixed solvent extractant system," *Hydrometallurgy*, vol. 102, Issues 1-4, Apr. 2010, pp. 37-42.

Baoping Xin, Di Zhang, Xian Zhang, Yunting Xia, Feng Wu, Shi Chen, Li Li, "Bioleaching mechanism of Co and Li from spent lithium-ion battery by the mixed culture of acidophilic sulfur-oxidizing and iron-oxidizing bacteria." *Bioresource Technology*, vol. 100, Issue 24, Dec. 2009, pp. 6163-6169.

Li L, Ge J, Wu F, Chen R, Chen S, Wu B, "Recovery of cobalt and lithium from spent lithium ion batteries using organic citric acid as leachant," *J. Hazard Mater.*, 176(1-3), Apr. 15, 2010, pp. 288-293.

M. Contestabile, S Panero, B Scrosati. "A laboratory-scale lithium-ion battery recycling process," *Journal of Power Sources*, vol. 92, Issues 1-2, Jan. 2001, pp. 65-69.

Daniel Assumpção Bertuola, Andréa Moura Bernardesa, Jorge Alberto Soares Tenóriob, "Spent NIMH batteries: Characterization and metal recovery through mechanical processing," *Journal of Power Sources*, vol. 160, Issue 2, Oct. 6, 2006, pp. 1465-1470.

Kim, Y. Matsuda, M., Shibayama, A., Fujita, T., "recovery of $LoCoO_2$ from Wasted Lithium Ion Batteries by using Mineral Processing Technology," *Resources Processing*, vol. 51, Issue 1, 2004, pp. 3-7.

Prengaman, R.D., "Challenges from corrosion-resistant grid alloys in lead acid battery manufacturing," *Journal of Power Sources*, vol. 95, 2001, pp. 224-233.

Dix, "A Comparison of Barton-Pot and Ball-Mill Processes for Making Leady Oxide," , J. Power Sources, 19 (1987).

Pavlov et al., "Lead/Acid Battery Positive Plates Manufactured From $4PbO \cdot PbSO_4$ Pastes Prepared from Leady Oxide and Red Lead," *Journal of Power Sources*, vol. 31, 1990, pp. 189-201.

Pavlov, D., "Effect of dopants (Group Va) on the performance of the positive lead/acid battery plate", Journal of Power Sources, vol. 33, 1991, pp. 221-229.

\* cited by examiner

RECYCLING ELECTROCHEMICAL CELLS AND BATTERIES

CROSS-REFERENCE TO RELATED APPLICATIONS

This patent application is a continuation-in-part application and claims the benefit of the filing date under 35 U.S.C. § 120 of co-pending U.S. patent application Ser. No. 14/222,005, filed on Mar. 21, 2014. U.S. patent application Ser. No. 14/221,005 is a continuation application and claims the benefit of the filing date under 35 U.S.C. § 120 of U.S. patent application Ser. No. 12/776,822, filed on May 10, 2010, which issued on May 6, 2014 as U.S. Pat. No. 8,714,361. U.S. patent application Ser. Nos. 12/776,822 and 14/222,005 are incorporated by reference into this specification.

BACKGROUND

Recycling of electrochemical cells and batteries is both economically and environmentally important. At the present time greater than 98% of lead acid batteries are recycled. Recycling of rechargeable and non-rechargeable consumer cells, e.g., button, D, C, AA and AAA size batteries that take advantage of Li-ion, Zn-carbon, and Zn alkaline chemistries is also desirable.

Currently recycling is dominated by pyrometallurgical refining Pyrometallurgical processes are not environmentally optimal, as they cause carbon dioxide emissions and generate waste materials, such as slag and dross. These methods of reprocessing spent materials are also costly due to the high energy intensity of pyrometallurgy.

In current recycling practice the spent batteries and cells are first sent to a breaking or shredding operation where they are subjected to mechanical comminution. Polymeric materials used in the cell casing are removed from the crushed batteries by a sink/float operation in which the low density plastics are floated away from the other materials due to density differences. In the case of lead acid batteries, the paste is then processed in a pyrometallurgical operation in which the materials are heated to >1000° C. in a chemical reducing atmosphere. In this operation the lead based compounds (i.e., $PbSO_4$, $PbO_2$, $PbO$) are chemically reduced to metallic lead which is removed for further metallurgical refining. These are very energy intensive processes, particularly in light of the fact that much of the lead produced in this operation is re-converted to lead oxides for use in the manufacturing of new lead acid batteries.

Carbon is present in many batteries as an electrochemically active material, such as an anode in a Li-ion cell, or as a modifier to improve electrical conductivity in the electrochemically active material, or to add a capacitive element to the battery to improve charge/discharge properties. When pyrometallurgical recycling techniques are used, the carbon can lead to excess carbon dioxide emissions and difficulty in maintaining the proper $CO_2/CO$ ratio for effective smelting. Conventional pyro- and hydro-metallurgical recycling processes for these cells also often render the carbon inactive, making it unsuitable for reuse in the construction of new batteries.

During the recycling process the presence of carbon can also limit the effectiveness of leaching, electrostatic and density driven separation processes. This has been found in recycling of both lead acid and non lead acid batteries, e.g., Li-ion, nickel-metal hydride and zinc based batteries. Specifically, in the case of leaching, where chemically active solutions are used to recover and separate metallic species, carbon can form colloidal suspensions which remove the leachant from the process. Carbon can be contaminated by the reagents used in hydrometallurgical operation, making disposal environmentally difficult. Therefore, removal of carbon prior to the recycling of batteries is beneficial.

While froth flotation has been used in other fields, it has not had application in the field of battery and electrochemical cell recycling. It has now been discovered that by using froth flotation technology to separate certain compounds during recycling of batteries, the thermochemical reduction step used in current recycling processes can be avoided. When froth flotation processes are used, the cost of producing recycled material suitable for reuse in the construction of new lead based electrochemical cells relative to pyrometallurgical processes can be reduced. Use of the froth flotation technique in recycling also has a reduced environmental impact relative to prior art pyrometallurgical techniques, as undesirable emissions are reduced or eliminated. When carbon is removed by froth flotation, the disadvantages associated with carbon can be avoided. In particular, carbon separated by froth flotation can be used directly in battery manufacture. Likewise, other battery materials separated by froth flotation are also of a grade suitable for direct use in battery manufacture.

SUMMARY

This specification describes, among other things, methods for recycling and reusing lead-acid battery active materials. In one example, a method comprises formulating a lead-acid battery active material paste comprising directly recycled lead dioxide ($PbO_2$) recovered from lead-acid battery scrap, wherein the directly recycled lead dioxide ($PbO_2$) is not subjected to pyrometallurgical operations or to hydrometallurgical operations between the recovery and the formulation. The lead-acid battery active material paste comprising the recycled lead dioxide ($PbO_2$) is pasted to a lead alloy battery grid.

In another example, a method comprises providing a recycled battery active material comprising carbon and/or a lead compound directly recovered from battery scrap, wherein the recycled battery active material is not subjected to pyrometallurgical operations or to hydrometallurgical operations after the recovery from the battery scrap. An active material paste is formulated comprising the recycled carbon and/or lead compound directly recovered from lead-acid battery scrap. The active material paste comprising the recycled carbon and/or lead compound is pasted to a lead alloy battery grid.

It is understood that the invention(s) described in this specification are not limited to the example embodiments summarized in this Summary.

DETAILED DESCRIPTION

According to the present invention, froth flotation is used to separate certain materials in spent batteries and electrochemical cells. As used in this application, references to batteries should be understood to include all types of batteries and electrochemical cells. The techniques included in the methods of the present invention may be used in lieu of prior art pyrometallurgical techniques that are environmentally less desirable due to cost, energy consumption and emissions.

As noted above, in current recycling practices, spent batteries and cells are first sent to a breaking operation where they a subjected to mechanical comminution. Polymeric materials used in the cell casing are removed from the crushed batteries by a sink/float operation in which the low density plastics are floated away from the other materials due to density differences. In the practice of the present invention, this preliminary comminution and removal process may be employed. The residual material is thereafter subjected to froth flotation separation.

Froth flotation separation is accomplished by manipulating the hydrophilic/hydrophobic characteristics of surfaces of the materials to be separated. Hydrophilic surfaces will tend to associate with water while hydrophobic surfaces will associate with a non-aqueous phase, for example, air or oil. To manipulate the hydrophilicity/hydrophobicity of a surface, chemical agents are used which preferentially attach themselves to the surface of a material. This is commonly achieved by creating an aqueous suspension to which the appropriate agents for manipulating the hydrophilic and hydrophobic characteristics of the materials to be separated are added, normally with mixing or stirring. For purposes of this application, it is to be understood that a froth flotation agent is a material that is suitable to manipulate the hydrophobic and/or hydrophilic nature of the material to be separated. After treatment with these agents, the suspension is passed to a vessel sparged with air. In this vessel hydrophobic materials adhere to air bubbles and are floated to the surface for removal preferentially versus the hydrophilic materials which sink or remain in the water. In this manner, materials may be separated from one another.

The methods of the present invention have application to separation of any battery components, the hydrophilic and hydrophobic nature of which can be manipulated relative to one another. Among the materials present in recycled battery materials suitable for separation via froth flotation are lead compounds and carbon. Although froth flotation has not been used where the cations in the materials to be separated are the same, in the practice of the present invention froth flotation has been found particularly suitable for separation of Pb(IV) from Pb(II) compounds. Similarly, it is possible to separate nickel compounds present in batteries from one another.

Commercially available froth flotation cells may be used in the practice of the invention. One suitable cell is the Denver D-12 cell. The material to be subjected to froth flotation is placed into the cell, preferably with a frothing agent. Suitable frothers include alcohols, pine oils, polyglycols, polyoxyparafins and xylenol. These reagents stabilize the formation of air entraining bubbles which effect separation based upon the modified hydrophobic and hydrophilic nature of materials being separated. Reagents known as collectors may also be added to the cell. Collectors help the hydrophobic materials float and/or adhere to the air bubbles. Depressants also may be added to the cell. Depressants help the hydrophilic materials sink and/or not become entrained in the froth.

Reagents which affect the hydrophobic and hydrophilic nature of the materials to be separated include fatty acids (e.g., stearates, oleates), xanthates, dithiophosphates, lignosulphonates, oximes, ureas and aminosulphonates. These reagents act to alter the characteristics of the species being separated. These reagents are added to the froth flotation cell according to conventional techniques.

Reagents which modify the absorption behavior of the aforementioned reagents are desirably used to improve the separation of the lead compounds. These modifiers include bases (e.g., CaO, NaOH, NaCO$_3$), acids (H$_2$SO$_4$, HCl, HNO$_3$), organics (e.g. dextrin, starch, glue), cations (Pb$^{2+}$, Ba$^{2+}$, Ca$^{2+}$, Cu$^+$, Pb$^{2+}$, Zn$^{2+}$, Ag$^+$), and/or anions (SiO$_3^{2-}$, PO$_4^{3-}$, CN$^-$, CO$_3^{2-}$, S$_2^-$).

Lead acid batteries are the dominant technology for energy storage in automotive starter, lighting and ignition batteries, uninterruptible power supplies, electric vehicles, telecommunications and alternative energy. The method of the present invention has particular application to lead acid batteries. In normal cell construction the battery consists of electrically active lead compounds and lead-based electrical conductors, along with casing material, usually a polymer. Table 1 below sets forth the typical composition of a spent lead acid battery.

TABLE 1

| Component | Fraction % |
| --- | --- |
| PbSO$_4$ | 50-60 |
| PbO$_2$ | 15-35 |
| PbO | 5-10 |
| Pb | 2-5 |
| Other | 2-4 |
| Total Active Material | 70-90 |
| Pb Grids, poles, top metal | 5-25 |
| Polymer case material | 5 |
| Total | 100 |

These fractions may vary somewhat in practice due to individual battery design and the charge/discharge profiles seen during use in an application.

When the present invention is employed, the active materials from lead acid batteries may be recycled for reuse in the manufacture of new lead acid batteries while avoiding the use of pyrometallurgical operations. In particular, in the recycling method of the present invention, froth flotation technology (rather than a pyrometallurgical operation) may be used to separate Pb(IV) materials, such as lead dioxide, from Pb(II) materials, such as lead oxide or lead sulfate.

To effect separation of the lead products according to the froth flotation method, the spent lead based batteries or cells are subjected to conventional breaking operations to mechanically comminute the battery or cell. Conventional techniques for removing polymeric casing materials from the crushed battery or cell are employed. This may be accomplished using a conventional sink/float operation in which the relatively low density plastics are floated away from the higher density lead based materials.

The resulting lead containing battery paste is subjected to a froth flotation process. Preferably before subjecting the lead paste to the froth flotation process, the paste is screened to remove undesirable particles that can contaminate the recycled lead compounds and/or contain particles with both Pb(IV) and Pb(II) compounds. The screening process desirably removes material that is greater than a 200 μm size.

To effect the froth flotation separation, the lead bearing paste is suspended in water, preferably with stirring or mixing. Froth flotation agents are added and blended to create what the art terms a "pulp" to be subjected to froth flotation. Any agent may be used that causes the particles to be separated to become hydrophobic and hydrophilic relative to each other so that the hydrophobic material to be separated will become entrained in air bubbles passed through the solution while the hydrophilic material remains in the solution and sinks. In the case of lead particles in the aqueous suspension, the hydrophobic materials will attach themselves to air bubbles produced by the froth flotation apparatus and thereby be separated from the hydrophilic particles during the froth flotation step. A Denver type of froth flotation device may be used. However, other configurations are also amenable for this purpose. For example, the froth flotation vessel may have a cascading arrangement as in the Denver cell in which the material to be separated is frothed through a series of cascading vessels or it may be a single vessel having a height that is effective to foster flotation over the top of only the hydrophobic materials. Separation is accomplished as the air bubbles float to the surface of the bath carrying away hydrophobic particles in deference to the hydrophilic particles which remain suspended in the aqueous bath.

Separation can be achieved by modifying the hydrophobic and hydrophilic nature of $PbO_2$ and $PbSO_4$ using froth flotation agents known as collectors. Suitable collectors include fatty acids (e.g., stearates, oleates), xanthates, dithiophosphates, lignosulfonates, oximes, ureas, aminosulphonates. These collectors act as surface active species allowing separation of Pb(IV) and Pb(II) compounds in aqueous media. This separation can be effected with and without frothers, such as alcohols, pine oils, polyglycols, polyoxyparafins, xylenol. Additionally modifiers can effect/affect the absorption of the flotation reagents upon each inorganic phase. Among modifiers useful in froth flotation are pH modifiers such as bases (e.g., CaO, NaOH, $NaCO_3$), acids ($H_2SO_4$, HCl, $HNO_3$), neutral organics (e.g., dextrin, starch, glue), cations ($Pb^{+2}$, $Ba^{2+}$, $Ca^{2+}$, $Cu^+$, $Pb^{2+}$, $Zn^{2+}$, $Ag^+$) and/or anions ($SiO_3^{2-}$, $PO_4^{3-}$, $CN^-$, $CO_3^{2-}$, $S^{2-}$). These frothers can modify the absorption behavior of the aforementioned flotation agents.

Froth flotation also can be applied to the removal of carbon from various materials as it is naturally hydrophobic. However, because a change in the surface chemistry of the carbon occurs when used in batteries, use of surface active chemical reagents is desirable to improve the floatability of carbon and to produce a product suitable for reuse in battery construction. This process of carbon separation by froth flotation may be improved by the removal of organic binders associated with electrode manufacturing.

The process of the invention also has application to recycling lithium batteries. A patent by Sloop, "System and method for removing an electrolyte from an energy storage and/or conversion device using a supercritical fluid," U.S. Pat. No. 7,198,865, teaches the use of supercritical $CO_2$ to remove the electrolyte from spent Li-ion and other cells. Combining this method with vacuum outgassing and/or extraction with suitable solvents can remove adherent organic compounds thereby improving the froth flotation separation by increasing the degree of difference between the hydrophilic and hydrophobic compounds making up the electrochemical cell.

The following general procedures may be used to effect froth flotation separation of materials in batteries.

First, the batteries are shredded to expose the contents for subsequent removal. In the second step the batteries are subjected to mechanical comminution, e.g., tumbling, shaking, vibration, to free the active materials from the cases, separators and cathode/anode conductive grids. At this point the third unit operation is to size classify the material removing the material to be floated which is nominally <200 μm from larger scrap consisting of again cases, separators and anode/cathode grids. This size classification can be done by screening wet or dry, wet elutriation or air classification. Our preferred methodology is wet screening or elutriation which prevents the fine particulate from becoming airborne becoming an environmental/worker health issue.

Step four is the key technology which is froth flotation. Reagents are added which preferentially absorb to the surface of the Pb compounds present in spent lead acid paste. Specifically $PbO_2$, PbO and $PbSO_4$ which are present in the active material of spent lead acid batteries. Three surface modification reagents, i.e., collectors, have been shown to be efficacious. These are mercaptobenzothiazole (MBT), its sodium salt (Na-MBT) and a dialkyl dithiophosphinate (sold under the name Aerophine by Cytec). Preferably these are added to $10^{-3}$ to $10^{-1}$ weight percent. These compounds enhance the flotation of $PbO_2$ while $PbSO_4$ sinks. It was found that the addition of methyl iso-butyl carbinol (MIBC) enhanced froth stability improving separation. Also in the case of MBT, the use of a lignosulfonate depressant (product 648 produced by Borregard-Lignotech) was found to enhance the flotation of $PbO_2$, while $PbSO_4$ floated in its absence. The preferred concentrations are shown in Table 2 along with the distribution coefficient of $PbSO_4/PbO_2$.

Carbon is known to be hydrophobic in nature, i.e., water repelling. While the other active materials within batteries are hydrophilic, i.e., water attracting, e.g., lithium metal oxides and phosphates, lead, zinc, and manganese inorganic compounds. When carbon is to be separated according to the present invention, air is sparged into a vessel that contains from 10-40 volume percent solids in aqueous media. Our preference is 15-20 volume percent to support fine particles, i.e., <75 μm. To improve the separation an organic phase is added to 0.1-5.0 volume percent. In preferred practice 1.0 volume percent of either methyl iso-butyl carbinol (MIBC) or kerosene is used. This enhances the flotation of the carbon by increasing the adherence of the carbon particulates to the rising air bubbles producing a carbon rich phase on the surface of the vessel. MIBC is preferred as it is easily removed from the carbon after froth flotation by vacuum outgassing at <1 torr or upon heat to 100° C. under flowing gas due to its higher vapor pressure than kerosene. The carbon reclaimed by this method is suitable to be reused in the construction of new batteries. To remove vestiges of contaminants from the carbon a washing step may be used in which impurities are removed by dissolution into acid/base solutions. This process is preferably followed by drying the material to a moisture content <10 weight percent and packaging for shipment.

The material which has not been floated that is now cleaned of carbon can be subjected to further reprocessing by hydrometallurgical, pyrometallurgical or physical purification techniques. For example, it is possible to acid leach Zn and Mn from the materials that sink in Zn—Mn cells. The leached material is then subjected to solvent extraction and electrowinning to Zn metal and $MnO_2$. In the case of Li-ion batteries, it is also possible to recover the Li metal oxide. When the recovered material is treated hydrothermally with LiOH and heat treated at 800° C. under flowing air, material suitable for use in the production of Li ion rechargeable batteries was recovered.

This technology has particular suitability in the recycling of advanced Pb-acid batteries which incorporate large amounts of carbon to increase the capacitance of the batteries. While carbon is key to improving the charge/discharge performance of these cells, for the recycling industry this is problematic as this excess carbon is in direct conflict with the desire to reduce carbon dioxide, emissions from the commonly used pyrometallurgical recycling operations. Additionally, the removal of carbon by froth flotation is considered an important pre-step to the use of froth flotation to separate $PbO_2$ and $PbSO_4$ as carbon adsorbs the reagents used to separate the phases and contaminates the phase that is floated.

In the case of all these battery chemistries the carbons are valuable in and of themselves costing as much as $40/kg, thus representing a significant cost in battery manufacturing. Recycling this material would allow for lower costs in battery manufacturing as the recycling process is less expensive than virgin material production.

As noted above, materials (such as carbon and lead dioxide, for example) recovered from spent or otherwise scrapped batteries or other electrochemical cells by the methods disclosed in this specification can be used in the production of new batteries or other electrochemical cells (such as lead-acid batteries, for example). These directly recycled materials can be used to produce new batteries or other electrochemical cells without employing pyrometallurgical recycling operations or hydrometallurgical recycling operations.

Lead-acid batteries operate in accordance with two electrochemical reactions at the positive electrodes/plates (cathodes) and two electrochemical reactions at the negative electrodes/plates (anodes). During battery discharge, electrons conduct from the negative electrodes/plates, through an external circuit to do work, and to the positive electrodes/plates. During battery discharge, at the positive electrodes/plates, lead dioxide is reduced to lead sulfate according to the chemical equation:

$$PbO_2(s) + HSO_4^-(aq) + 3H^+(aq) + 2e^- \rightarrow PbSO_4(s) + 2H_2O(l)$$

During battery discharge, at the negative electrodes/plates, metallic lead is oxidized to lead sulfate according to the chemical equation:

$$Pb(s) + HSO_4^-(aq) \rightarrow PbSO_4(s) + H^+(aq) + 2e^-$$

During battery charging and recharging, electrons conduct from the positive electrodes/plates, through an external circuit that provides the energy driving the conduction, and to the negative electrodes/plates. During battery charging and recharging, at the positive electrodes/plates, lead sulfate is oxidized to lead dioxide according to the chemical equation:

$$PbSO_4(s) + 2H_2O(l) \rightarrow {}^*PbO_2(s) + HSO_4^-(aq) + 3H^+(aq) + 2e^-$$

During battery charging and recharging, at the negative electrodes/plates, lead sulfate is reduced to metallic lead according to the chemical equation:

$$PbSO_4(s) + H^+(aq) + 2e^- \rightarrow Pb(s) + HSO_4^-(aq)$$

At the point of manufacture, the negative electrodes/plates of lead-acid batteries generally comprise porous (spongy) metallic lead active material adhered to a solid grid structure made of a lead alloy, and the positive electrodes/plates generally comprise an active material comprising lead dioxide ($PbO_2$) adhered to a grid structure also made of a lead alloy (which may be the same as or different than the lead alloy forming the negative electrode/plate grid). The production of negative and positive electrodes/plates comprises a pasting process in which pastes comprising precursors of the active materials are applied to the grids, cured, and electrochemically converted (i.e., formed) into the active materials through an electrochemical formation process.

The pastes used to produce lead-acid battery electrodes/plates generally comprise an aqueous sulfuric acid solution, a powder form of lead oxide(s), and additives. The powdered lead oxides (which are the precursors of the spongy lead active material (negative electrode) and the lead dioxide active material (positive electrode)) may be provided, for example, from a metallic lead source using a ball mill process, a Barton process, a refractory furnace process, a rotary tube furnace process, or a high-temperature fume-type process.

A ball mill process is a semi-batch process in which metallic lead ingots (also known as pigs or slugs) are charged with air into a ball mill. Frictional heat generated by the tumbling solid lead ingots initiates an oxidation reaction in which oxygen in the air reacts with the lead to produce lead oxide. During the milling, particles of the lead oxide that forms on the surface of the ingots and particles of un-oxidized lead break off of the ingots, forming a powder that is removed from the ball mill by a circulating air stream. Centrifugal mills and cyclones may be used to collect larger particles, and finer particles are collected in a baghouse. A ball mill process produces a leady oxide powder comprising both lead oxide particles and metallic lead particles.

A Barton process is a continuous process in which metallic lead is melted and fed vertically into a stirred production vessel (such as a cast iron pot, for example). The molten lead fed through the top of the production vessel contacts spinning blades, which break-up the molten lead stream into small atomized droplets. The droplets of molten lead are then oxidized to lead oxide by air flow through the production vessel. The oxidized lead solidifies into lead oxide particles that are pneumatically transported from the production vessel to a product recovery system (generally comprising a settling chamber, cyclone, and/or baghouse, for example). A Barton process is controlled by adjusting the rate of molten lead feed, the speed of the stirring blades, the temperature of the system, and the rate of air flow through the production vessel. Depending on process conditions, a Barton process may produce either litharge (PbO) powder or a leady oxide powder comprising both lead oxide particles and metallic lead particles.

A refractory furnace process is a batch process in which a solid metallic lead charge is heated by a gas flame impinging on its surface in a furnace vessel. The solid metallic lead charge is located in a steel pan equipped with a rotating vertical shaft and a horizontal crossarm comprising mounted plows. The plows continuously move the metallic lead charge to expose fresh surfaces for oxidation by the impinging gas flame. A refractory furnace process may produce litharge (PbO) powder containing traces of red lead and/or metallic lead.

A rotary tube furnace process is a continuous process in which molten lead is fed into the upper end of a refractory lined inclined rotating tube. An oxidizing flame located in the lower end of the tube oxidizes the molten lead flowing through the tube. The tube is long enough so that the molten lead completely oxidizes before emerging from the lower end. A rotary tube furnace process produces litharge (PbO) powder containing traces of red lead and/or metallic lead.

A high-temperature fume-type process is a continuous process in which a fine powder of high-purity litharge (PbO) is produced by burning a fine stream of molten lead in a special blast-type burner having a flame temperature around 1200° C., which vaporizes and oxidizes the molten lead feed to produce a fume. The fume is swept out of the reaction chamber by an air stream, cooled in a series of "goosenecks," and collected in a baghouse. The median particle diameter of the powder produced in a high-temperature fume-type process is from 0.50 to 1.0 micrometers, as compared with 3.0 to 16.0 micrometers for litharge (PbO) powders produced by other methods.

The lead oxide powders used to produce active material precursor pastes may comprise one or more of litharge (PbO), lead dioxide ($PbO_2$), lead sulfate ($PbSO_4$), red lead ($Pb_3O_4$), leady oxides, lead hydrates, and/or combinations of any thereof, such as, for example, mixtures metallic lead, PbO, $PbO_2$, and/or other lead oxides, sulfides, or hydrates. The pastes used to produce lead-acid battery electrodes/plates may also comprise additives such as seeding materials (e.g., tetrabasic lead sulfate ($PbSO_4$.4PbO) or other lead sulfates), expander materials (e.g., mixtures of carbon, barium sulfate, and/or lignosulfonate), and/or binder materials (e.g., ammonium sulfate or magnesium sulfate). The pastes are formulated to provide, among other properties, a pre-cure consistency (rheology) that facilitates the application of the pastes onto the lead alloy grids, sufficient cohesive binding of the paste material together and adhesive binding to the grids during curing, and sufficient porosity in the cured paste material.

The lead oxide powders used to formulate the pastes applied to the grids cannot be effectively applied to the grids in a dry condition because of insufficient cohesion among the powder particles. Mixing the lead oxide or leady oxide powders with aqueous sulfuric acid to make a paste provides greater cohesion and enables application to the grids. During a paste-mixing operation, lead oxide or leady oxide powder and water may be blended in a mixer to form a thick slurry or paste. Dilute sulfuric acid may then be added slowly with constant mixing and cooling until the desired paste consistency and density are attained. The sulfuric acid forms lead sulfate, which in addition to expanding the paste and giving it greater porosity, supplies a necessary binding agent so that the cured plate can be handled without the loss of significant amounts of material. The application of the pastes to the grids may be performed manually or using a pasting system to fill the open spaces in the grid. In either case, the pastes are applied to the grids and form a densely packed and evenly distributed mass of paste material integrated into the grid structure. The plates (pasted grids) may be rolled to a given thickness and/or flash dried to remove surface moisture.

The pasted plates are cured in still or forced air at elevated temperatures and controlled relative humidity. Under the curing conditions the water in the paste at least partially evaporates and the sulfuric acid reacts with the metallic lead and/or lead oxides in the paste to form lead sulfate, thereby solidifying and hardening the pastes. The applied pastes cure to a hardened mass, in which condition the pastes firmly adhere to the grids, providing pasted plates that can be handled and manipulated during further processing and production without mechanical loss of cured paste.

After curing, the lead and/or lead oxide precursors in the paste are electrochemically converted into lead-acid battery active material in a "forming" or "formation" operation, which is essentially an initial electrochemical charging operation. Depending on the particular manufacturing implementation, the pasted and cured plates may be formed independently, in cell assemblies, or in completed batteries. For example, the pasted and cured plates may be mounted in aqueous sulfuric acid tanks with alternating positive and negative plates. The positive plates may be electrically connected together in parallel in one group and the negative plates electrically connected together in parallel in another group. Current may then be passed through the assembly of plates in a manner similar to battery charging or recharging, during which lead, lead oxides, and lead sulfate in the group of positive plates react to form lead dioxide, and lead oxides and lead sulfate in the group of negative plates react to form metallic lead. In some manufacturing implementations, the positive plates and the negative plates may be formed independently in separate aqueous sulfuric acid tanks against "dummy" electrodes.

Depending on the polarity, the passing of current through the pasted and cured plates electrochemically converts lead, lead oxides, and lead sulfate into brown-colored lead dioxide, forming positive plates, or converts lead oxides and lead sulfate into gray-colored spongy metallic lead, forming negative plates. The formation of lead dioxide and spongy metallic lead on the positive plates and negative plates, respectively, would occur even if the same paste formulation was used to produce the respective plates. However, the composition of the pastes used to respectively produce positive plates and negative plates is generally different and specifically formulated to provide physical and chemical properties particularly suited for the respective plate types.

Upon completion of the forming process, the plates may be washed and dried. In some manufacturing implementations, multiple grids may be cast and pasted together, and these may be cut apart and the lugs sized to dimensions suitable for cell construction. Formed negative plates may also be rolled or pressed after removal from the forming tank to reduce surface roughness of the spongy metallic lead active material, which may form a relatively rough surface because of outgassing that may occur during the electrochemical reduction of lead oxides and lead sulfate to metallic lead. The plates are then in condition for use in the production of lead-acid battery cells.

The production of lead-acid battery cells may comprise burning, brazing, or otherwise connecting the lugs of a plurality of like-polarity plates to a lead or lead alloy strap that electrically interconnects the plates, forming a plate pack (i.e., a positive plate pack or a negative plate pack) comprising the plurality of plates, spaced apart from each other, but electrically connected in parallel via the strap. A positive plate pack and a negative plate pack may be assembled together in an intermeshed configuration such that each positive plate of the positive plate pack is positioned adjacent to one or two negative plates of the negative plate pack. Electrically insulating porous separators are positioned between the adjacent positive and negative plates to prevent short circuits through physical contact while permitting ionic flow. Assemblies comprising a positive plate pack, a negative plate pack, and separators form individual electrochemical cells. The internal positive plates of a cell are located between two negative plates with intermediate separators, and the internal negative plates of a cell are located between two positive plates with intermediate separators. A terminal positive plate of a cell is located adjacent to one internal negative plate, and a terminal negative plate of a cell is located adjacent to one internal positive plate.

A lead-acid battery comprises at least one individual electrochemical cell, and often comprises a plurality of cells electrically interconnected in series, inside a plastic casing containing aqueous sulfuric acid electrolyte. For example, automobile starting, lighting, and ignition (SLI) batteries generally comprise six 2.1-volt cells interconnected in series, providing a 12.6-volt system at full charge. The completed lead-acid battery is produced by assembling the one or more cells inside the casing, electrically interconnecting the cells to external terminals, filling the casing with the aqueous sulfuric acid electrolyte, and sealing the casing.

Recycling methods for spent or otherwise scrapped lead-acid batteries may involve hydrometallurgical and/or pyrometallurgical operations to recover metallic lead and, in some cases, subsequent re-oxidation of the recovered metallic lead in a lead oxide or leady oxide powder production process such as a ball mill process, a Barton process, a refractory furnace process, a rotary tube furnace process, or a high-temperature fume-type process. The lead oxide or leady oxides produced by these processes and operations can be used to re-formulate lead-acid battery active material precursor pastes, but these operations and processes are energy-intensive and relatively expensive. The methods described in this specification may be used to produce recycled lead-acid battery active materials recovered from lead-acid battery scrap without any hydrometallurgical or pyrometallurgical processing, and without any lead oxide or leady oxide powder production processing such as ball mill processing or Barton processing, for example. These directly recycled materials can be used in the production of new battery plates, for example, at reduced energy cost.

Spent or otherwise scrapped lead-acid batteries may be processed as described above to separate the liquid or gel electrolyte, plastic/polymeric components (e.g., casing, separators), metallic components (e.g., grids, terminals, straps), and the active material pastes. The separated active material paste is a mixture of positive electrode/plate active material and negative electrode/plate active material, and may comprise, for example, in percent by weight, 50-60% lead sulfate, 15-35% lead dioxide, 5-10% lead monoxide, 2-5% metallic lead, and 2-4% other materials (including carbon, for example). Materials such as carbon, lead dioxide, lead monoxide, and/or lead sulfate recovered from spent or otherwise scrapped batteries and separated using a froth flotation operation, for example, may be directly recycled into the production of new batteries or other electrochemical cells (such as lead-acid batteries, for example) without pyrometallurgical recycling operations (e.g., smelting of lead compounds to metallic lead) or hydrometallurgical recycling operations (e.g., fluoroboric or fluorosilicic acid leaching of desulfurized lead-acid battery paste or lead carbonate conversion and reduction to metallic lead). Materials such as carbon, lead dioxide, lead monoxide, and/or lead sulfate recovered from spent or otherwise scrapped batteries and separated using a froth flotation operation may also be directly recycled into the production of new batteries or other electrochemical cells (such as lead-acid batteries, for example) without lead oxide or leady oxide powder production processes such as a ball mill process or a Barton process, for example.

A method for the production of battery plates may comprise providing a recycled battery active material comprising carbon and/or a lead compound (e.g., $PbO_2$, PbO, and/or $PbSO_4$) recovered from battery scrap. The recycled carbon and/or lead compound recovered from lead-acid battery scrap may be used to formulate an active material paste. The active material paste comprising the recycled carbon and/or lead compound may be pasted to a lead alloy battery grid.

The pasting of the active material paste to a lead alloy battery grid may comprise applying the active material paste to the grid, wherein a mass of paste material is integrated into the grid structure. The applied active material paste may be cured, wherein the paste hardens and adheres to the grid structure to provide an intermediate plate. The intermediate plate may be formed by passing an electrical current through the intermediate plate in contact with an aqueous sulfuric acid solution. The intermediate plate may be formed to provide a positive plate comprising lead dioxide ($PbO_2$) active material integrated into the grid structure. Alternatively, the intermediate plate may be formed to provide a negative plate comprising spongy metallic lead active material integrated into the grid structure.

A plurality of formed plates may be connected together in parallel to provide a plate pack. Two plate packs and separators may be assembled into an electrochemical cell. A battery may be assembled comprising at least one electrochemical cell inside a plastic casing containing an aqueous sulfuric acid electrolyte.

Formulating an active material paste may comprise mixing components comprising an aqueous sulfuric acid solution and lead dioxide ($PbO_2$) powder recovered from battery scrap. Formulating an active material paste may comprise mixing components comprising an aqueous sulfuric acid solution, lead and/or a lead compound, and carbon recovered from battery scrap. Formulating an active material paste may comprise mixing components comprising an aqueous sulfuric acid solution, lead and/or a lead compound recovered from battery scrap, and carbon recovered from the battery scrap.

Providing a recycled battery active material comprising carbon and/or a lead compound recovered from battery scrap may comprise separating lead-acid battery paste from lead-acid battery scrap. The lead-acid battery paste may be suspended in water. At least one froth flotation operation may be performed to separate carbon and/or a lead compound from the suspension. The lead-acid battery paste separated from lead-acid battery scrap is not subjected to pyrometallurgical operations or to hydrometallurgical operations before the production of a new battery or battery component. In various embodiments, carbon may be separated from metallic lead, lead dioxide ($PbO_2$), lead oxide (PbO), and/or lead sulfate ($PbSO_4$) in the suspension. In various embodiments, lead dioxide ($PbO_2$) may be separated from metallic lead, lead oxide (PbO), and/or lead sulfate ($PbSO_4$) in the suspension.

The recycled carbon and/or lead compound may be provided by a process comprising separating lead-acid battery paste from lead-acid battery scrap, suspending the lead-acid battery paste in water, adding a froth flotation agent to the suspension, sparging a froth flotation vessel with a gas to create a froth in the suspension, and separating carbon and/or a lead compound from the suspension. The froth flotation agent may comprise at least one of mercaptobenzothiazole, sodium mercaptobenzothiazole, or dialkyl dithiophosphinate. The froth flotation agent may comprise at least one of methyl isobutyl carbinol or kerosene. The recycled battery active material may be provided by a process further comprising classifying the lead-acid battery paste to particle sizes of less than 200 micrometers before suspending the lead-acid battery paste in water.

In various embodiments, an active material paste comprising recycled lead dioxide ($PbO_2$) recovered from lead-acid battery scrap may be formulated and used to paste positive lead-acid battery plates. The pasting of plates using active materials paste comprising directly recycled lead dioxide ($PbO_2$) may be particularly advantageous during the formation of the plates (by passing an electrical current through intermediate plates in contact with an aqueous sulfuric acid solution) because a high $PbO_2$ content in the cured pastes will reduce the electrical resistance and formation time, resulting in more efficient plate formation.

In various embodiments, a chemical polishing and/or a desulfurization operation may be performed on active materials recycled from spent or otherwise scrapped batteries before using the recycled active materials to formulate pastes for the production of new batteries. In various embodiments, the active material precursor pastes may be formulated with only recycled active materials (e.g., carbon, lead dioxide, lead monoxide, and/or lead sulfate recovered from spent or otherwise scrapped batteries) or mixed with virgin leady oxides, red lead, or litharge.

EXAMPLES

Example 1

Separation of Pb(IV) and Pb(II)

Experimental tests of the process and reagents have been demonstrated by the use of a Denver, D-12 style flotation cell obtained from Metso Minerals. The screened material, 300 grams, was placed within the Denver cell and suspended in 3 liters of water with mixing 5 minutes. Air was sparged into a vessel containing from 10-40 volume percent solids in an aqueous stream, preferably 15-20 volume percent to support fine particle flotation, i.e., <75 μm and maximum throughput. Flotation agents were added and blended for 5 minutes providing for what is termed in the art as a pulp to be subjected to froth flotation. All processing was done at pH in the range of 4-10, with a pH=7.0-8.5 being preferred. Other flotation cell configurations/designs are also amenable for this purpose with the Denver style being common to laboratory process evaluation.

Lead acid battery paste was obtained from the battery wrecking operations of Quemetco Metals in Indianapolis, Ind. This paste represents a mixed feed of automotive, industrial, telecommunications and power supply batteries and cells.

The material was screened to a <200 μm size using conventional methods. This screening operation can provide benefits beyond simple sizing. For example, to optimize the separation of $PbO_2$ from $PbSO_4$ based particles, the reduction or elimination of multiphase particles is desirable. Screening or size fractionation accomplishes this. Also polymer and/or glass fibers are commonly present in the active paste materials as additives for purposes of reinforcement. These additive materials in the paste consume reagents and contaminate products into which the recycled lead is to be incorporated. Therefore, removing these additives during the recycling process enhances the value of the process overall.

About 300 grams of the screened material was placed in a Denver cell D-12 style cell obtained from Metso Minerals and suspended in 3 liters of water with mixing for about 5 minutes. At this point reagents were added and blended for 5 minutes. The details of the procedure are set forth below.

Experimental Procedure:
1. Screening of paste to 200 μm in preparation for flotation:
   a. Five-hundred grams of as-received Pb paste is weighed out;
   b. Five-hundred milliliters of DI water is collected;
   c. The paste and water are combined in a standard blender;
   d. Contents are blended for five minutes to produce a uniform slurry;
   e. Slurry is poured onto a 200 μm screen within a 5-gallon bucket;
   f. Slurry is stirred slowly, allowing for the minerals to pass through the screen while the remaining polymer fibers are trapped;
   g. Small amounts of wash water (DI) are added periodically to ensure screening is complete;
   h. The bucket of screened paste is left to settle for a period of time (at least overnight);
   i. Most of the water is decanted.
2. Screening of paste to 100 μm in preparation for flotation:
   a. Five-hundred grams of screened paste (200 μm) is weighed out;
   b. Five-hundred milliliters of DI water is collected;
   c. The paste and water are combined in a standard blender;
   d. Contents are blended for five minutes to produce a uniform slurry;
   e. Slurry is poured onto a 100 μm screen within a 5-gallon bucket;
   f. Slurry is stirred slowly, allowing for the smaller minerals to pass through the screen while the remaining larger ones are trapped;
   g. Small amounts of wash water (DI) are added periodically to ensure screening is complete;
   h. The bucket of screened paste is left to settle for a period of time (at least overnight);
   i. Most of the water is decanted.
3. Screening of Paste to 50 μm in preparation for flotation:
   a. Five-hundred grams of screened paste (100 μm) is weighed out;
   b. Five-hundred milliliters of DI water is collected;
   c. The paste and water are combined in a standard blender;
   d. Contents are blended for five minutes to produce a uniform slurry;
   e. Slurry is poured into a 50 μm filter held over a small plastic bucket;
   f. Slurry is kneaded by hand slowly, allowing for the fine minerals to pass through the filter while the remaining larger ones are trapped;
   g. Small amounts of wash water (DI) are added periodically to ensure screening is complete;
   h. The bucket of screened paste is left to settle for a period of time (at least overnight);
   i. Most of the water is decanted.
4. Milling/Grinding Paste in Preparation of Flotation:
   The paste is milled and ground according to conventional procedures;
5. Flotation Procedure:
   a. Denver Flotation Cell is set up;
   b. Three-hundred grams of screened Pb paste (Procedure 1) is weighed out;
   c. Three liters of DI water are collected and added to the Denver Cell;
   d. The Denver Cell is turned on with the air intake valve closed;
   e. The speed is adjusted;
   f. Lead paste is added;
   g. Reagents are selected and added to the slurry;
   h. The slurry is blended without air input for five minutes;
   i. The air intake valve is opened and the slurry is allowed to mix with air for five minutes;
   j. The froth is continuously skimmed from the top of the Denver Cell and deposited in an alternate tank for ten minutes;
   k. Samples of the froth are collected after one minute, after five minutes, and after ten minutes;
   l. The Denver Cell is turned off to let the main tank settle while the alternate is cleaned;
   m. The main tank is slowly decanted and a sample of the sink is taken;
   n. All samples taken during the procedure are allowed to air dry.

6. Three-Tiered Flotation Procedure:
   a. Denver Flotation Cell is set up;
   b. Three-hundred grams of screened Pb paste (Procedure 1) is weighed out;
   c. Three liters of DI water is collected and added to the Denver Cell;
   d. The Denver Cell is turned on with the air intake valve closed;
   e. The speed of is adjusted;
   f. Lead paste is added;
   g. Reagents are selected and added to the slurry;
   h. The slurry is blended without air input for five minutes;
   i. The air intake valve is opened and the slurry is allowed to mix with air for five minutes;
   j. The froth is continuously skimmed for ten minutes and deposited in a small plastic bucket marked "Float 1";
   k. The Denver Cell is turned off;
   l. The main tank is drained and rinsed into another small plastic bucket marked "Sink 1";
   m. Both buckets are allowed to settle overnight;
   n. The water is slowly decanted of each bucket;
   o. Small samples are taken from each for submittal;
   p. The remainder of the two bucket's contents are run through Procedure 5 again, taking the place of the "Three-hundred grams of screened paste," and replacing the markings of the buckets with "Float 2" and "Sink 2" respectively;
   q. Once step 5 has been completed for "Float 2" and "Sink 2," those buckets' contents are run through Procedure 5 a third time, marking them as "Float 3" and "Sink 3";
   r. All samples taken are allowed to air dry.

Efficacy of a particular reagent combination is calculated as K, which is the ratio of the materials of interest in the floated (hydrophobic) phase to the material of interest in the sink (hydrophilic) phase. A K value of 1 indicates no separation. The more the K value deviates from 1, the more desirable it becomes as the increasing K value reflects increased separation of the materials of interest. In this experiment the separation of $PbO_2$ from $PbSO_4$ was the desired objective. Therefore, K represents this separation. If K<1 the $PbO_2$ is floated. If K>1, $PbSO_4$ is floated. Which lead compound is floated depends on the chemistry of the reagents used. K values were determined by Leco Sulfur and X-Ray diffraction analysis.

In Table 2, the results of series of trials testing combinations of collectors, depressants and frothers is given.

TABLE 2

Compilation of Studies for the Separation of $PbO_2$ and $PbSO_4$

| Collector | Collector Concentration | Depressant | Depressant Concentration | Frother | Frother Concentration | K |
|---|---|---|---|---|---|---|
| NaMBT | 1.00E−02 | | | MIBC | 1.00E−02 | 0.66 |
| AP | 1.00E−02 | | | MIBC | 1.00E−02 | 0.53 |
| MBT | 1.00E−02 | 648 | 1.00E−02 | MIBC | 1.00E−02 | 0.76 |
| MBT | 1.00E−02 | | | MIBC | 1.00E−02 | 1.32 |

Example 2

Use of MBT

A flotation experiment incorporating MBT (mercaptobenzylthiazole) was conducted. MIBC was also used at this time to provide a steadier froth. This experiment was run using screened paste, requiring procedure 1, and centered on attempting to raise the pH of the slurry in order to determine its significance. Specifically, between steps 5f and 5g, flakes of NaOH were added to the slurry while monitoring the pH level. Although the attempt to raise the pH to 10 was largely unsuccessful due to a reaction between the NaOH and the $PbSO_4$, the remainder of procedure 5 was completed and samples were dried and submitted. Analysis of the "K" values reveals this combination to be highly efficient in the opposing direction, floating the $PbSO_4$ instead of the $PbO_2$.

A second flotation experiment incorporating MBT was run using screened paste, requiring procedure 1. Flotation commenced following procedure 5, with some slight alterations. During step 5j, the froth was skimmed into a small plastic bucket instead of an alternate tank. Step 5k did not take place during the action of flotation. Instead, samples were taken from the plastic bucket after sufficient time for settling had taken place, roughly overnight. The "Float Scum" sample represents the surviving organic layer after settling, whereas the "Float" sample was collected from the material that had settled out of the float bucket's solution. The "Float Scum" sample had a K=0.66 and the "Float" sample had a K=0.95.

Example 3

Use of Aerophine

As received paste was processed, therefore bypassing all of procedures 1, 2, 3, and 4 of Example 1. Procedure 5 was followed, producing samples that were dried and submitted for carbon and sulfur content analysis. Dividing the sulfur content of each float sample by the corresponding sink sample yielded a "K" value, representing the efficiency of this particular reagent combination. A "K" value less than one signified the flotation of $PbO_2$. The samples taken on this date gave K=1.04, 1.1, 0.94.

Screened paste was used per procedure 1, as was the frother MIBC. "K" values of 0.8 and 0.53 were achieved. It is believed that removal of the polymer fibers (larger than 200 μm) provided the reagents more access to the targeted minerals.

In a further experiment with aerophine, screened paste was again subjected to procedure 1 and the frother MIBC was used. Similar to the experiment mentioned above, NaOH was used between steps 5f and 5g to raise the pH and raised the pH to 8.3. The resultant "K" value was 0.89.

Example 4

Use of NaMBT

A flotation experiment incorporating NaMBT was conducted using the frother MIBC for stability. Procedures 1 and 5 were followed with a slight alteration. As with previous experiments, during step 5j, the froth was skimmed into a small plastic bucket instead of an alternate tank. Step 5k did not take place during the action of flotation. Instead, samples were taken from the plastic bucket after sufficient time for settling had taken place, roughly overnight. The results were a "K" value of 0.76 for the Float Scum, and 0.79 for the Float.

A second experiment was run in which procedures 1 and 5 were followed. The reagent combination was NaMBT with MIBC and the depressant 648. This run proceeded with the same alterations to steps 5j and 5k. A "K" value of 0.90 was achieved.

A third flotation experiment was run on the same day (Dec. 11, 2008) in which procedures 1 and 5 were followed with the same alterations to steps 5j and 5k. This time, a combination of NaMBT and the depressant 648 was used, producing a K=0.95.

Example 5

Use of Aerophine

Aerophine was tested again, this time in combination with the frother MIBC and the depressant 648. Procedures 1 and 5 were followed with a slight alteration. As with previous experiments, during step 5j, the froth was skimmed into a small plastic bucket instead of an alternate tank. Step 5k did not take place during the action of flotation. Instead, samples were taken from the plastic bucket after sufficient time for settling had taken place, roughly overnight. Although the resultant separation of lead compounds was poor (K=1.25 and 1.04), the sink was very low in carbon content.

A second flotation experiment using aerophine with MIBC was run in which procedures 1 and 5 were followed. This experiment proceeded with the same alterations to steps 5j and 5k. Results showed a "K" value of 0.94.

A third flotation experiment using a combination of aerophine and the depressant 648 was run in which procedures 1 and 5 were followed with the same alterations to steps 5j and 5k. This produced a K=0.85.

Example 6

Use of MBT

Another flotation experiment was run using MBT on screened paste (procedure 1). This time the addition of the frother MIBC was coupled with the depressant 648, a lignosulfonate. Flotation in the Denver Cell, following procedure 5, was completed and samples taken. The results showed "K" values of 0.76, 0.86, and 0.79.

A similar flotation experiment featured screened paste (procedure 1) combined with MBT and MIBC. Procedure 5 was followed, producing samples. Data from the sulfur analysis indicated "K" values of 1.3, 1.0, and 0.97.

Example 7

Three-Tiered Flotation with NaMBT

A three-tiered flotation experiment was conducted using a combination of NaMBT and MIBC. Screened paste was used per Procedure 1. Procedure 6 was followed in its entirety, producing three float samples and three sink samples. Although a float of sink 1 sample, a sink of float 1 sample, a float of sink 2 sample, and a sink of float 2 sample were also produced, the four samples were regarded as intermediate stages and rejected as irrelevant. Results of the third tier showed a stable, nearly linear separation with almost identical "K" values across all three floats (K=0.787 in first float, 0.774 in second float, and 0.787 in third float). This means that separation was occurring at close to the same rate at all three stages.

Example 8

Three-Tier Flotation with Aerophine

A three-tiered flotation experiment was completed using a combination of Aerophine and MIBC. Screened paste was used per procedure 1. Procedure 6 was followed again, producing three float samples and three sink samples. Similarly to the previously reported instance, four intermediate samples were also taken. The "K" values of Floats 1, 2, and 3 were 0.86, 1.03, and 0.98 respectively.

Example 9

Carbon Removal

The procedure for removal of carbon can be effected using procedure 1 for screening and procedures 5 and 6 for flotation.

Specifically, procedures 1 and 2 were carried out using LiMOx black mass floated with only water (No Add) and with the reagents MIBC, kerosene, and dodecylphenol. These reagents were chosen because of their known wetability to carbon. After flotation had been completed, the samples were dried and submitted for carbon analysis by LECO. The measured carbon content of each float sample was divided by the carbon contained in the sink to produce a "K" value used to determine the efficiency of separation. This value was calculated for all flotation results.

According to the resultant data (Table 3), the reagent MIBC produces the best separation, though simple flotation in water is nearly as efficient. It has been theorized that this efficiency is mainly due to carbon's natural hydrophobicity. The MIBC reagent merely provides a stable froth from which to draw the carbon.

TABLE 3

| Flotation of LiMOx Black Mass Reagent Comparison | | |
|---|---|---|
| Sample ID | Carbon wt % | K values |
| BM, No Add, 10 min | 60.8 | 2.79 |
| BM, No Add, Sink | 21.8 | |
| BM, Kerosene, 10 min | 56.0 | 2.60 |
| BM, Kerosene, Sink | 21.5 | |
| BM, MIBC, 10 min | 70.1 | 2.85 |
| BM, MIBC, Sink | 24.6 | |
| BM, Dodecylphenol, 10 min | 35.5 | 1.45 |
| BM, Dodecylphenol, Sink | 24.4 | |

Example 10

Three-Tiered Carbon Flotation

A three-tiered flotation experiment was completed in which LiMOx Black Mass was used in conjunction with the frother MIBC. Procedures 1 and 3 were followed and samples were produced, dried, and submitted for carbon analysis. The results of this experiment are set forth in Table 4 and reflect excellent separation.

TABLE 4

Three-tiered Flotation of LiMOx + MIBC

| Sample ID | Co (wt %) | Cu (wt %) | Fe (wt %) | Carbon (wt %) | Carbon (K value) |
|---|---|---|---|---|---|
| BM + MIBC Float | 29.30 | 0.27 | 0.07 | 41.04 | 1.96 |
| BM + MIBC Float x2 | 25.30 | 0.27 | 0.07 | 53.84 | 3.12 |
| BM + MIBC Float x3 | 20.70 | 0.29 | 0.06 | 68.55 | 2.97 |
| BM + MIBC Float of Sink | 35.50 | 0.28 | 0.09 | 32.06 | |
| BM + MIBC Float of Sink of Sink | 27.20 | 0.30 | 0.08 | 47.80 | |
| BM + MIBC Sink | 39.70 | 0.36 | 0.07 | 20.96 | |
| BM + MIBC Sink x2 | 42.00 | 0.38 | 0.07 | 17.23 | |
| BM + MIBC Sink x3 | 41.10 | 0.37 | 0.07 | 23.08 | |
| BM + MIBC Sink of Float | 39.20 | 0.26 | 0.06 | 28.95 | |
| BM + MIBC Sink of Float of Float | 30.40 | 0.25 | 0.05 | 46.25 | |

The samples listed above were resubmitted for X-ray analysis and another round of carbon testing by LECO. The resubmitted set of data (Table 5) was very similar to the initial, except for the second tier sink.

TABLE 5

| Sample ID | carbon (wt %) | sulfur (wt %) | K values |
|---|---|---|---|
| BM + MIBC Float | 41.10 | N/A | 2.069486 |
| BM + MIBC Float x2 | 52.95 | N/A | 2.355427 |
| BM + MIBC Float x3 | 66.39 | N/A | 2.774342 |
| BM + MIBC Sink | 19.86 | N/A | |
| BM + MIBC Sink x2 | 22.48 | N/A | |
| BM + MIBC Sink x3 | 23.93 | N/A | |

Eight-hundred grams of Zn black mass was wet screened according to Procedure 1. Flotation of the black mass (less than 200 μm) was effected per Procedure 2. The four samples were allowed to air dry for two weeks before preparation and submittal.

It is clear from the results (Table 6) that the separation of the carbon between the float and the sink is efficient, similar to previous results with the LiMOx Black Mass.

TABLE 6

| Sample ID | carbon (wt %) | K value |
|---|---|---|
| Screened Zn—C BM | 6.02 | 2.03 |
| Screened Zn—C BM + MIBC Float 1 min | 8.67 | 2.92 |
| Screened Zn—C BM + MIBC Float 5 min | 7.87 | 2.65 |
| Screened Zn—C BM + MIBC Float 10 min | 7.26 | 2.44 |
| Screened Zn—C BM + MIBC Sink | 2.97 | |

What is claimed is:

1. A method comprising:
   formulating a lead-acid battery active material paste, the lead-acid battery active material paste comprising:
   directly recycled lead dioxide ($PbO_2$) recovered from lead-acid battery scrap, wherein the directly recycled lead dioxide ($PbO_2$) is not subjected to pyrometallurgical operations or to hydrometallurgical operations between the recovery and the formulation; and
   at least one of the following:
   barium sulfate;
   magnesium sulfate; and
   pasting the lead-acid battery active material paste to a lead alloy battery grid, wherein the pasting comprises applying the lead-acid battery active material paste to the grid, wherein a mass of the lead-acid battery active material paste is integrated into a grid structure.

2. The method of claim 1, wherein the pasting of the lead-acid battery active material paste to a lead alloy battery grid comprises:
   curing the applied lead-acid battery active material paste, wherein the lead-acid battery active material paste hardens and adheres to the grid structure to provide an intermediate plate; and
   forming the intermediate plate by passing an electrical current through the intermediate plate in contact with an aqueous sulfuric acid solution.

3. The method of claim 2, wherein the intermediate plate is formed to provide a positive plate comprising lead dioxide ($PbO_2$) active material integrated into the grid structure.

4. The method of claim 2, further comprising connecting a plurality of formed plates together in parallel with a strap to provide a plate pack.

5. The method of claim 4, further comprising assembling two plate packs and a plurality of separators into an electrochemical cell.

6. The method of claim 5, further comprising assembling a battery comprising at least one electrochemical cell inside a plastic casing containing an aqueous sulfuric acid electrolyte in contact with the plates.

7. The method of claim 1, wherein formulating the active material paste comprises mixing together components comprising an aqueous sulfuric acid solution and recycled lead dioxide ($PbO_2$) powder recovered from lead-acid battery scrap.

8. The method of claim 1, further comprising providing the directly recycled lead dioxide ($PbO_2$) recovered from lead-acid battery scrap, wherein the providing comprising:
   separating lead-acid battery paste from lead-acid battery scrap;
   suspending the lead-acid battery paste in water; and
   performing at least one froth flotation operation to separate lead dioxide ($PbO_2$) from the suspension.

9. The method of claim 8, wherein lead dioxide ($PbO_2$) is separated from metallic lead, lead oxide (PbO), and/or lead sulfate ($PbSO_4$) in the suspension.

10. The method of claim 8, wherein the directly recycled lead dioxide ($PbO_2$) is provided by a process further comprising classifying the separated lead-acid battery paste to particle sizes of less than 200 micrometers before suspending the lead-acid battery paste in water.

11. The method of claim 8, wherein the directly recycled lead dioxide ($PbO_2$) is provided by a process comprising:
   separating lead-acid battery paste from lead-acid battery scrap;
   suspending the lead-acid battery paste in water;
   adding a froth flotation agent to the suspension;
   sparging a froth flotation vessel with a gas to create a froth in the suspension; and
   separating lead dioxide ($PbO_2$) from the suspension.

12. The method of claim 11, wherein the froth flotation agent comprises at least one of mercaptobenzothiazole, sodium mercaptobenzothiazole, or dialkyl dithiophosphinate.

* * * * *